(No Model.)
H. M. RICE & J. O'DAY.
VEHICLE WHEEL.
No. 392,756. Patented Nov. 13, 1888.
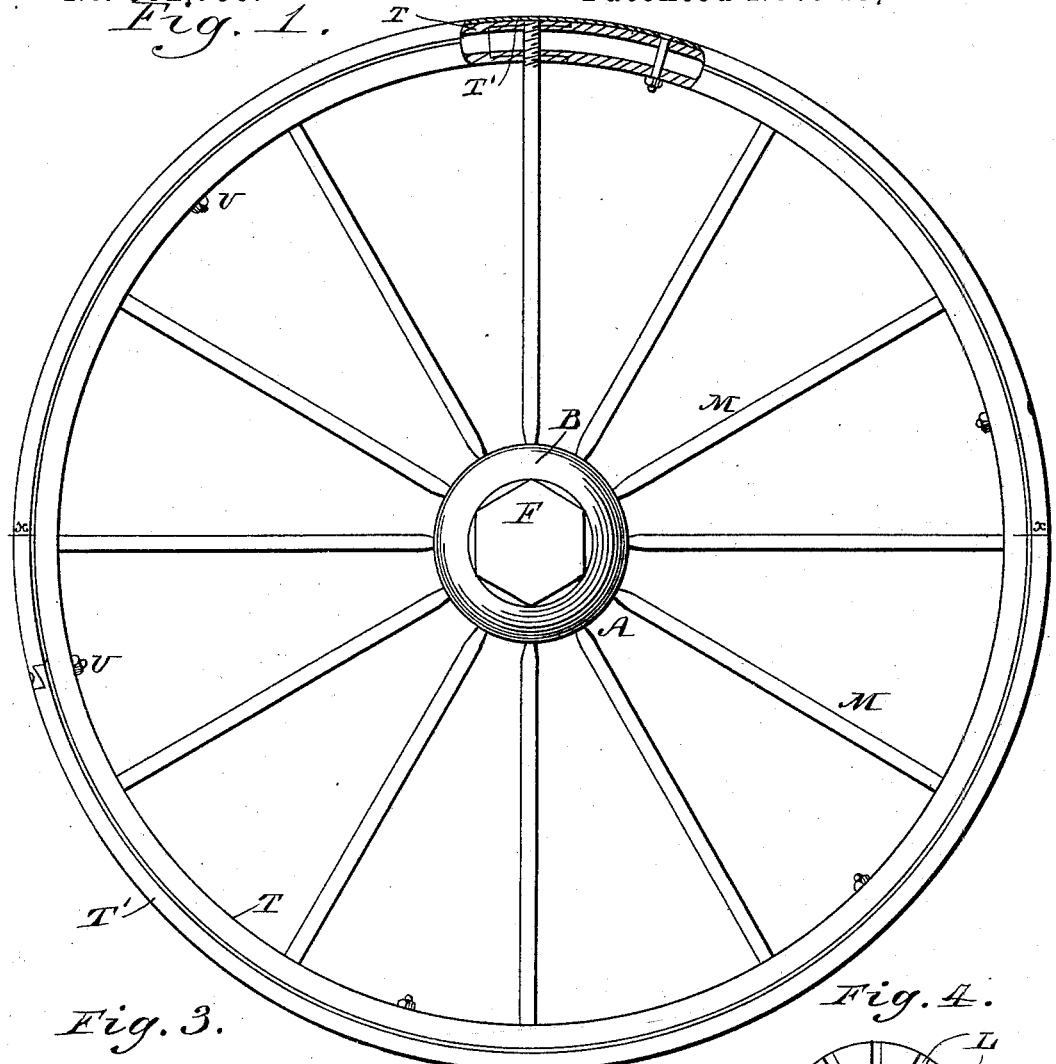
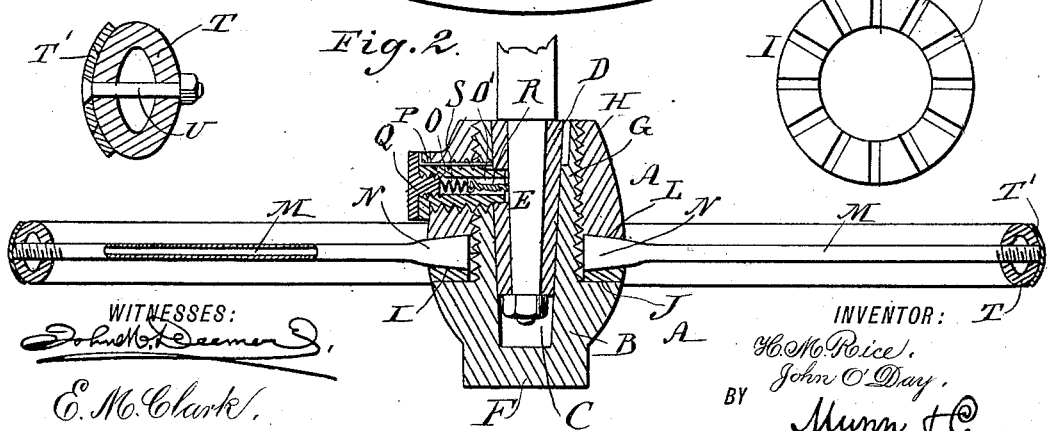
WITNESSES:
INVENTOR: H. M. Rice, John O'Day,
BY Munn & Co.
ATTORNEYS.

UNITED STATES PATENT OFFICE.

HENRY M. RICE AND JOHN O'DAY, OF ALLEGHENY, PENNSYLVANIA.

VEHICLE-WHEEL.

SPECIFICATION forming part of Letters Patent No. 392,756, dated November 13, 1888.

Application filed July 17, 1888. Serial No. 280,167. (No model.)

*To all whom it may concern:*

Be it known that we, HENRY M. RICE and JOHN O'DAY, both of Allegheny, in the county of Allegheny and State of Pennsylvania, have invented a new and useful Improvement in Vehicle-Wheels, of which the following is a full, clear, and exact description.

This invention comprises certain improvements in the structure of vehicle-wheels, having for their objects, among others, to provide for the ready removal of any of the spokes for renewal or repairs without disturbing the felly or tire, and for the automatic lubrication of the axle-bearings, and to secure greater strength, durability, lightness, and efficiency than has been heretofore generally attained.

In order that the invention may be fully understood, we will first describe in detail the mode in which the invention may be carried into effect, and then point out the essential features of the invention in claims.

Reference is to be had to the accompanying drawings, forming a part of this specification, in which similar letters of reference indicate corresponding parts in all the figures.

Figure 1 is a side elevation of a vehicle-wheel embodying my invention, part being in section. Fig. 2 is a sectional plan view of the said wheel on the line x x, Fig. 1, showing also the axle-spindle on which it is mounted. Fig. 3 is a cross-sectional view of the felly and tire of the said wheel. Fig. 4 is a view of a part hereinafter referred to.

The hub A of the improved wheel here shown is constructed, mainly, of an outer section, B, an inner section, H, and an intermediate section, I.

The outer section, B, is formed with a central tapering bore, C, extending from its inner end to receive the axle-box D, which is keyed thereto, as illustrated, and is mounted to turn as usual on the axle-spindle E, and an integral head, F, closing its outer end to exclude dust and the like from the several bearing-surfaces, and the inner part of the section A is reduced, forming a neck, G, which is threaded externally and terminates in an annular shoulder, J.

The intermediate section, I, is placed loosely on the neck G against the shoulder J, and the inner section, H, is threaded internally, so as to screw as a collar on the neck J up to the section I. The adjacent surfaces of the sections H and I are formed with corresponding outward-tapering radial half-sockets L, in and between which are inserted the inner ends of the spokes M, which have correspondingly-flaring heads N, before the sections H B are secrewed together, and the outer section, B, is then screwed up tightly, so as to firmly clamp and lock the spokes in place, the section I turning as a washer on the shoulder J to permit such movement of the section B.

The inner section, H, the neck G of the outer section, B, and the axle-box D are formed with corresponding lateral holes inside the spokes M, those in the section H and neck G being threaded internally, forming a socket in which is screwed an externally-threaded tubular plug, O, so as to lock the several sections of the hub and the axle-box D securely together. A fine wire, P, is seated in a longitudinal groove formed in the side of the plug O to prevent the same from becoming accidentally loosened.

A threaded stopper, Q, is screwed into the outer end of the bore of the plug O, forming a closed chamber, O', in which the axle-grease or a similar lubricating substance may be placed and will be held in communication with the bearing-surfaces of the axle and box.

A twisted wire, R, of copper or other good heat-conducting material, is placed in the grease-chamber O' in contact with the bearing-surface of the axle-spindle E, and a spring, S, is arranged in the chamber between the said conductor R and the screw-stopper Q in such a manner that as the conductor R is heated by its rotation in frictional contact with the axle-spindle the heat will be conducted throughout the grease, melting the same and causing it to be automatically supplied as needed to the axle-bearing surfaces, and by properly adjusting the stopper Q the tension of the spring S, and thus the pressure of the conductor R upon the axle-spindle E can be readily regulated, so as to produce a greater or less flow of the lubricating substance as desired.

The felly T, and preferably the whole wheel, is made of steel, and the felly is of hollow oval cross-section, the dovetail spliced tire T' being made concave internally to fit thereover and secured thereto by countersunk bolts U. One jointing end of the felly is reduced, forming a neck, and the bore of the other end enlarged to receive the said neck and make a smooth joint, and the outer end of the spoke M at that point, which is threaded, is screwed through both ends of the felly to lock them together. The remaining spokes M are also threaded at their outer ends and are screwed through the felly before their headed inner ends are locked in the hub A, as before described. The outer end of the outer hub-section, B, is squared for reception of a wrench by which the hub-sections may be screwed together.

Having thus described our invention, what we claim as new, and desire to secure by Letters Patent, is—

1. In a vehicle-wheel hub, the combination of the outer section, B, provided with the externally-threaded neck G and annular shoulder J, the intermediate section, I, fitting loosely on the neck G against the shoulder J, and the internally-threaded inner section, H, the adjacent surfaces of the sections H I being provided with outward-tapering half-sockets L, substantially as herein shown and described.

2. In a vehicle-wheel, the combination, with the apertured axle-box D, of the hub-section B, provided with the screw-threaded and apertured neck G, the intermediate section, I, and the internally-threaded and apertured section H, and the plug O, fitting in the apertures of the axle-box D, neck G, and section H, substantially as described.

3. In a vehicle-wheel, the combination, with the apertured axle-box D, of the outer hub-section, B, provided with the apertured neck G, the intermediate section, I, the inner apertured section, H, the hollow plug O, fitting in the apertures of the axle-box, neck, and section, the stopper Q', the wire R in the hollow plug, and the spring Q between the upper end of the wire and the stopper Q', substantially as herein shown and described.

4. The combination, with an axle-box and wheel-hub having corresponding lateral holes, of a tubular plug screwed through both holes to lock the box and hub together, and also to serve as a grease-box and a stopper for the tubular plug, substantially as described.

5. A wheel the felly of which is of hollow oval cross-section, one jointing end of the felly being reduced to form a neck and the bore of the other end enlarged to receive said neck, and one of the spokes of which is screwed through both of said ends when jointed, substantially as described.

HENRY M. RICE.
JOHN O'DAY.

Witnesses:
WILLIAM H. GRAHAM,
JOHN McVEIGH.